March 7, 1961 L. J. SIRI 2,973,773
AIR VOLUME CONTROL FOR WATER SYSTEMS
Filed May 12, 1958

INVENTOR.
LOUIS J. SIRI.
BY
Lockwood, Galt, Woodard & Smith.
ATTORNEYS.

United States Patent Office 2,973,773
Patented Mar. 7, 1961

2,973,773

AIR VOLUME CONTROL FOR WATER SYSTEMS

Louis J. Siri, South Bend, Ind., assignor to Penn Controls, Inc., Goshen, Ind., a corporation of Indiana Filed May 12, 1958, Ser. No. 734,495

2 Claims. (Cl. 137—209)

This invention relates generally to air volume controls, and particularly to a control for maintaining the proper air cushion in a pressure tank utilized with a deep well, submerged pump water system.

In deep well water systems utilizing submerged pumps, valve means are customarily provided for injecting a column of air into the pressure tank with each cycle of the pump. The air thus provided maintains withdrawals of water from the system without cycling the pump on each withdrawal. In these types of water systems continual replenishing of the air cushion is necessary because air is entrained or dissolved in water drawn off into the service lines. In certain submerged pump installations, the volume of air added to the tank on each pump cycle exceeds the volume of air loss therefrom during subsequent withdrawals.

It has been customary to provide controls for bleeding from the pressure tank any excess air in order to maintain the proper volume therein. These controls have invariably involved the use of floats or similar means for sensing the water level and hence the volume of air within the tank.

It is an object of the present invention to provide a control for relieving a water system pressure tank of excess air, the control being of a simplified, rugged construction which can be manufactured at relatively low cost.

It is a further object of the present invention to provide a control which senses the depth of water in a water system pressure tank without using floats or similar direct water level sensing means.

It is a further object of the present invention to provide a control for relieving excess air from the pressure tank of a water system, the control permitting, within limits, the accumulation of excess air within the tank to thereby supercharge the tank.

The full nature of the invention will be understood from the accompanying drawings and the following description and claims:

Figure 1:
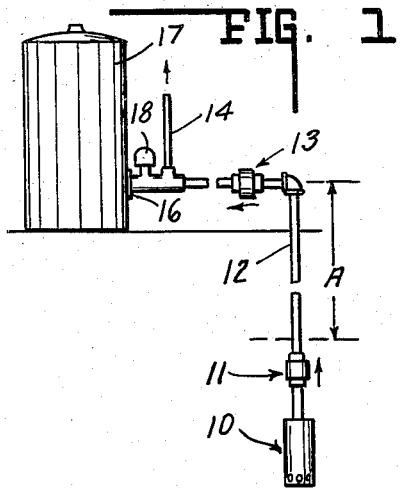
Fig. 1 is a schematic view of a submerged pump water system into which the control of the present invention may be incorporated.

Referring initially to Fig. 1, there is shown a conventional submerged pump water system, the pump being generally indicated at 10. The pump is located below the water level in a well and has its discharge line connected to a check valve indicated generally at 11. The check valve 11 is of a conventional type and is provided with an aperture (not shown) which permits water on the upstream side of the check valve to return to the well when the check valve is closed.

A length of pipe 12 connects the check valve 11 to a second check valve indicated generally at 13. The check valve 13 is also of a conventional type and is provided with a water inlet aperture (not shown) which permits air to enter the pipe 12 when the check valve 13 is closed. As schematically indicated in Fig. 1, the upstream side of the check valve 13 is connected to a fitting providing a service line 14 and a connection indicated at 16 communicating with the interior of the pressure tank 17. The fitting also includes means for mounting a pressure switch 18, electrically connected so as to control the motor driving the pump 10. The pressure switch is conventionally set so that when the pressure within the tank 17 falls to approximately 20 pounds per square inch gage, brought about by service withdrawals, the submerged pump will be started. Water will thereupon be moved by the pump through the check valves 11 and 13 and into the service line 14 and into the pressure tank 17. When the pressure in the tank is brought to approximately 40 pounds per square inch gage, the pressure switch 18 will deactuate the pump. The pressure switch thus serves to cycle the pump so as to maintain the pressure in the tank between 20 and 40 pounds per square inch.

It should be noted that when water is pumped into an empty tank, such as tank 17, the air which is in the tank at atmospheric pressure becomes compressed until the pressure switch cutout setting is reached and causes the pump to stop. Conventionally, this cutout setting is 40 pounds per square inch, as previously mentioned, and at this pressure the water level in a tank, such as tank 17, will be at approximately 73% of the tank height. When water is withdrawn so that the tank pressure falls to the pressure switch cut-in setting of 20 pounds per square inch, the water level in the tank will be at approximately 58% of the tank height.

It is important to maintain an air cushion of proper volume at the top of the tank to insure satisfactory operation of the system. If the air cushion becomes too small, for example, because of the loss of air entrained in water withdrawn from the tank, the pump will be caused to cycle with each withdrawal. If the air cushion becomes too large, for example, because of the injection of too much air into the tank, air will pass through the service line, creating an undesirable condition. Since the amount of water withdrawal which can be made between the cut-in and cutout settings of the pump control is directly dependent upon the amount of air trapped in the tank, some water system installations provide a means for injecting air so that the tank water level is lower than 58% of the tank height at the pressure switch cut-in point of 20 pounds per square inch. The pressure tank under these conditions is referred to as being "supercharged."

In the system of Fig. 1, when the pump is stopped, water will drain from the pipe 12 into the well through the aperture provided in the check valve 11. Air will enter the pipe 12 through the aperture in the check valve 13 so that each time the pump is stopped a column of air, indicated at A in Fig. 1, will be provided in the system. When the pump is restarted, the column of air will be injected into the tank 17 to maintain the air cushion therein. In this conventional system, controls are customarily provided to vent the air cushion to atmosphere when the water level in the tank reaches a predetermined minimum height, thereby preventing accumulation of an air cushion of an undesirably large volume. The control of the present invention is a simplified device for limiting the volume of the air cushion in a pressure tank, such as that indicated at 17.

Figure 2:
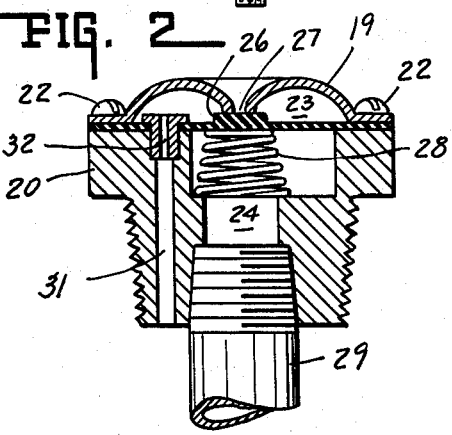
Fig. 2 is a side elevational view of a control embodying the present invention.

Referring now to Fig. 2, it may be seen that the control embodying the present invention comprises a housing formed of an upper member 19 and a lower member 20 threaded to permit mounting on a tank. The upper member overlies a flexible wall or diaphragm 21, which is clamped between the upper and lower members by suitable screws 22. The flexible wall divides the housing into an upper pressure chamber 23 and a lower pressure chamber 24. A pad or closure 26 carried by the flexible wall is urged into sealing relationship with a bleed aperture 27 in the upper member, the sealing force being provided by a compression spring 28 bottoming upon a suitably formed internal shoulder in the lower member 20.

A standpipe 29 is threaded into the lower member and communicates with the pressure chamber 24. The lower member is further provided with a passage which communicates with the central bore of a drilled spud 32. The spud 32 extends through a suitable opening in the movable wall 21 and provides communication for the passage 31 with the upper pressure chamber 23.

Figure 3:
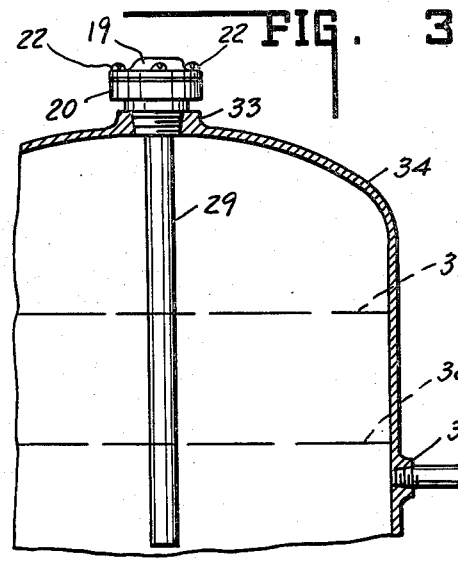
Fig. 3 is a sectional view showing the control of the present invention mounted upon a pressure tank.

Referring to Fig. 3, the control just described is shown mounted in the threaded opening 33 of a pressure tank 34. The tank is provided with a pump inlet opening 36 and the water level in the tank at 40 pounds per square inch (the pump cutout setting) and the water level at 20 pounds per square inch (the pump cut-in setting) are indicated at 37 and 38, respectively. It will be noted that the standpipe 29 has a length such that its open end is disposed well below the water level 38 and the pump inlet opening 36.

In operation, as the tank is initially filled, water will rise therein to the level indicated at 37 in both the tank and the standpipe. This water level corresponds to a pressure of 40 pounds per square inch in the tank, the pump being shut down when the pressure reaches the 40 pounds per square inch value. Upon subsequent withdrawals of water through the service line, the water level in the tank and standpipe will recede progressively. After withdrawals sufficient to lower the water level in the tank to that indicated at 38, representing a 20 pound per square inch pressure in the tank, the pump will be started and will inject a predetermined amount of air into the tank. The water level in the tank will thereupon rise until a pressure of 40 pounds per square inch is again attained within the tank.

Because of the injection of additional air into the tank, with the starting of the pump on this second cycle thereof, the water level corresponding to 40 pounds per square inch pressure will be somewhat below the water level indicated at 37.

With each subsequent pump operation the water in the tank will be disposed at a lower level as the pump is shut down. During these operations of the pump the tank is thus provided with a supercharging air cushion. During this progressive lowering of the water level corresponding to 40 pounds per square inch pressure in the tank, the water level in the standpipe remains at that indicated at 37. It should be noted that a progressively increasing differential exists between the pressure in the chamber 24 and the pressure in the area above the water level in the tank reflected in chamber 23. This pressure differential is equal to the weight of the water in the standpipe that is above the water level in the tank. When this pressure differential becomes great enough, indicating that an undesirably large air cushion is present in the tank, the movable wall 21 will move against the force exerted by spring 28 and will open the vent 27 to atmosphere. The excess increment of air will thus be removed from the tank, permitting the air cushion therein to assume a proper value. It may thus be seen that the control described permits operation of the water system with the tank in a desirably supercharged condition, that is, with the maximum allowable air cushion.

Figure 5:
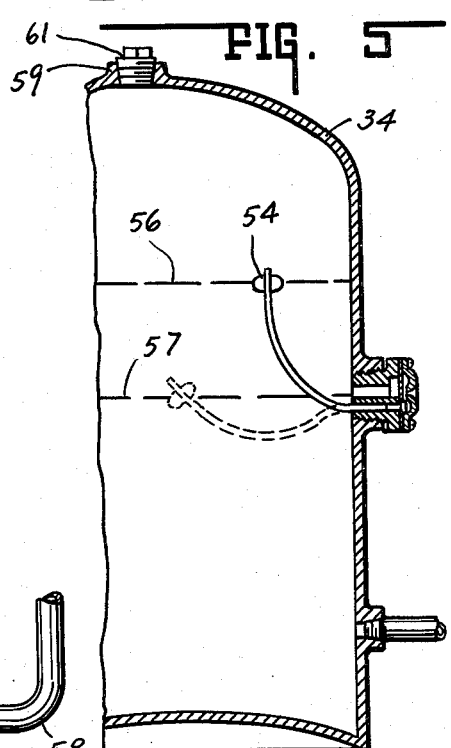
Fig. 5 is a sectional view showing the control of Fig. 4 mounted upon a pressure tank.
Figure 4:
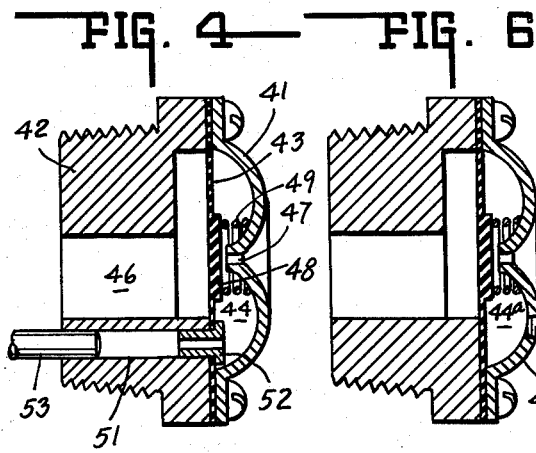
Fig. 4 is a side sectional view showing a modified form of the present invention.

Referring now to Figs. 4 and 5, a modified form of the present invention will be described. In this form the housing comprises peripherally joined members 41 and 42. A movable wall or diaphragm 43 divides the housing into a pressure chamber 44 and a pressure chamber 46. The member 41 has an aperture 47 therein venting the chamber 44 to atmosphere.

The movable wall carries a pad 48 which is adapted to seal the vent 47. A compression spring 49 urges the pad 48 out of sealing relation with the vent. The housing member 42 is provided with a passage 51 which communicates with the central bore of a drilled spud 52. The spud 52 extends through a suitable opening in the movable wall 43 and provides communication with the chamber 44. A flexible tube 53 is received within the passage 51, communication being thereby provided between the interior of the tube and the chamber 44.

Referring now to Fig. 5, it will be noted that the housing is threaded into a suitable opening in the tank wall and the end of the tube 53 is retained above the water level in the tank by means of a float 54 attached thereto. The water level in the tank at 40 pounds per square inch pressure is indicated at 56 and the water level at 20 pounds per square inch pressure is indicated at 57. As indicated in Fig. 5 by broken lines, the open end of the tube 53 is maintained above the water level in the tank as the pressure therein varies between the cutout and cut-in settings (40 pounds per square inch and 20 pounds per square inch, respectively) of the pump control.

In operation, a differential will exist between the pressure in the chamber 44 and the chamber 46, and this differential in pressure will be a direct function of the height of the water in the tank. As long as the water level in the tank is at a height indicating a proper air cushion therein, the pressure in the chamber 46 will exceed that in chamber 44 by an amount sufficient to overcome the force of spring 49 and retain the vent 47 in sealed condition. When the water level in the tank drops to a point such that the pressure in chamber 46 no longer overcomes the force of spring 49, the vent 47 will be opened, allowing air to escape from the tank. Thereafter, when the water level in the tank again reaches a value indicating the proper air cushion therein, the vent 47 will be closed and the operation of the water system will continue. When the water level in the tank again falls sufficiently to indicate the presence of an undesirably large air cushion in the tank, the vent 47 will be reopened to reduce the air cushion volume.

It will be noted that the flexible tube 53 and the float 54 might be replaced by a rigid tube bent upwardly and of sufficient length to extend above the maximum water level in the tank. With such an arrangement, however, some orienting means would be required on the control housing to assure that the tube would extend upwardly when the threading of the housing into the tank was completed.

Figure 6:
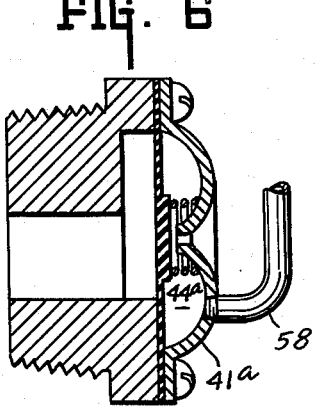
Fig. 6 is a side sectional view of a further modified form of the present invention.

Referring now to Fig. 6, a further modified form of the present invention will be described. In this form of the invention the components of the control are identical to that shown in Fig. 4 except that the housing member, referred to at 41a in Fig. 6 is provided with a tube 58 which communicates with the adjacent pressure chamber 44a. The housing shown in Fig. 6 is mounted in a pressure tank identically as shown in Fig. 5. The tube 58 is applied by means of a suitable compression fitting, or similar device into the upper central opening 59 in the tank, the plug 61 having been removed therefrom.

When so mounted, it will be obvious that the control of Fig. 6 will function exactly as the control of Fig. 4, the only difference being that communication between one of the pressure chambers and the space above the water level in the tank is provided by the exterior tube 58, rather than by the flexible tube 53 and its accompanying float.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A control for relieving a water system pressure tank of excess air comprising a housing having a movable wall therein dividing said housing into adjacent pressure chambers, a vent to atmosphere communicating with one of said chambers, means carried by said movable wall for sealing said vent, means for resiliently urging said wall into a position wherein said sealing means seals said vent said housing being adapted to be mounted on a pressure tank above the normal water level therein, a passage within said housing providing communication between the space above the water level in said tank and said one of said pressure chambers, and a standpipe communicating with the other of said pressure chambers and extending downwardly within said pressure tank below the water level reached in normal operation of said tank, said standpipe opening into said other pressure chamber and being open at its lower end but otherwise providing a closed conduit, whereby said vent is opened to atmosphere upon the existence of a predetermined differential between the pressure in said space above the water level in said tank and the pressure in said standpipe, indicating the presence of excess air in said tank.

2. A control for relieving a water system pressure tank of excess air comprising a housing having a movable wall therein dividing said housing into adjacent pressure chambers, a vent to atmosphere communicating with one of said chambers, a closure carried by said movable wall adapted to seal said vent, a compression spring within said housing urging said closure into vent sealing position, said housing being adapted to be mounted on a pressure tank above the normal water level therein, a passage within said housing providing communication between the space above the water level in said tank and said one of said pressure chambers, and a conduit communicating with the other of said pressure chambers and extending downwardly within said pressure tank below the water level reached in normal operation of said tank, said conduit opening into said other pressure chamber and being open at its lower end but otherwise providing a closed conduit, whereby said vent is opened to atmosphere upon the existence of a predetermined differential between the pressure in said space above the water level in said tank and the pressure in said standpipe, indicating the presence of excess air in said tank.

References Cited in the file of this patent

UNITED STATES PATENTS 1,834,245     Kantor et al. _____ Dec. 1, 1931